US010579542B2

(12) United States Patent
Celik

(10) Patent No.: US 10,579,542 B2
(45) Date of Patent: Mar. 3, 2020

(54) BROWSER SESSION STORAGE AS STORAGE FOR PRIVATE KEY IN PUBLIC-KEY ENCRYPTION SCHEMA

(71) Applicant: Mucteba Celik, Jersey City, NJ (US)

(72) Inventor: Mucteba Celik, Jersey City, NJ (US)

(73) Assignee: Revbits, LLC, Melville, NY (US)

( * ) Notice: Subject to any disclaimer, the term of this patent is extended or adjusted under 35 U.S.C. 154(b) by 193 days.

(21) Appl. No.: 15/818,127

(22) Filed: Nov. 20, 2017

(65) Prior Publication Data

US 2018/0329833 A1 Nov. 15, 2018

Related U.S. Application Data

(60) Provisional application No. 62/504,178, filed on May 10, 2017.

(51) Int. Cl.
*H04L 29/06* (2006.01)
*G06F 12/14* (2006.01)
*G06F 21/60* (2013.01)

(52) U.S. Cl.
CPC ........ *G06F 12/1408* (2013.01); *G06F 21/602* (2013.01); *H04L 63/045* (2013.01); *H04L 63/0435* (2013.01); *H04L 63/0442* (2013.01); *H04L 63/061* (2013.01); *H04L 63/168* (2013.01); *G06F 2212/1052* (2013.01)

(58) Field of Classification Search
None
See application file for complete search history.

(56) References Cited

U.S. PATENT DOCUMENTS

| 6,711,553 | B1* | 3/2004 | Deng | G06F 21/10 705/51 |
| 8,667,603 | B2* | 3/2014 | Brown | G06Q 10/107 380/277 |
| 8,813,247 | B1* | 8/2014 | Alten | G06F 21/31 380/45 |
| 9,117,062 | B1* | 8/2015 | Fitch | G06F 21/30 |
| 9,225,690 | B1* | 12/2015 | Fitch | H04L 63/0428 |
| 2004/0125957 | A1* | 7/2004 | Rauber | G06Q 20/04 380/259 |
| 2005/0154877 | A1* | 7/2005 | Trench | G06Q 20/02 713/156 |

(Continued)

*Primary Examiner* — Maung T Lwin
(74) *Attorney, Agent, or Firm* — Mandelbaum Silfin Economou LLP

(57) ABSTRACT

An encryption system, method, and computer software program product provides encrypted transmission of data between a server and a web browser application on a client computing device. The system includes an Internet browser; a JavaScript data encryption library; a public key encryption algorithm; a server; and a public private key pair of the user. The JavaScript library loads in user's browser and configured with symmetric and asymmetric encryption libraries and codes. Server sends an encrypted key data to the browser/JavaScript application. The user may then provide their private key and the JavaScript library decrypts the encrypted key data and obtains a symmetric key used to encrypt the data the server transmits to the browser during a session. With the server transmitting data in encrypted form, the browser is configured to decrypt the received data using the JavaScript data encryption library and the private key of the user.

10 Claims, 3 Drawing Sheets

(56) References Cited

U.S. PATENT DOCUMENTS

| | | | | |
|---|---|---|---|---|
| 2011/0054767 A1* | 3/2011 | Schafer | ............... | G08G 1/0104 |
| | | | | 701/119 |
| 2012/0297288 A1* | 11/2012 | Mansouri | .............. | G06F 16/972 |
| | | | | 715/234 |
| 2015/0180847 A1* | 6/2015 | Nix | ...................... | H04W 12/06 |
| | | | | 713/168 |
| 2015/0296379 A1* | 10/2015 | Nix | ...................... | H04L 9/0869 |
| | | | | 713/171 |
| 2015/0365394 A1* | 12/2015 | Fitch | ...................... | G06F 21/30 |
| | | | | 726/7 |
| 2016/0323254 A1* | 11/2016 | Manges | ................... | H04L 9/14 |
| 2017/0295144 A1* | 10/2017 | Song | ................. | H04L 63/0428 |
| 2018/0324211 A1* | 11/2018 | Doshi | ................ | H04L 63/1458 |

* cited by examiner

BROWSER SESSION STORAGE AS STORAGE FOR PRIVATE KEY IN PUBLIC-KEY ENCRYPTION SCHEMA

CROSS-REFERENCE TO RELATED APPLICATION

This application claims the benefit of priority of U.S. provisional application No. 62/504,178, filed May 10, 2017, the contents of which are herein incorporated by reference.

BACKGROUND OF THE INVENTION

The present invention relates to data security, and more particularly to encryption for data security in web browsing computing environments.

Presently it is difficult to transmit and receive highly encrypted and secure data so that it is conveniently accessible through a client browser without additional software installed. Similarly, there is no simple solution for conveniently maintaining encrypted data at rest and in transit for a web-driven application.

As can be seen, there is a need for improved for data encryption for web browsing computing environments providing protection while data is at rest and in transit.

SUMMARY OF THE INVENTION

In one aspect of the present invention, a computer-readable memory adapted for use by a client browser to browse an encrypted web content hosted on a server is disclosed. The computer-readable memory is used to direct a computer to perform the steps of: prompting a client for a private key upon initiating a browser session; receiving the private key in a JavaScript data encryption library. The computer then receives an encrypted symmetric key from the server hosting the encrypted web content. Once received, the computer decrypts the encrypted symmetric key in the JavaScript data encryption library. The browser may then the encrypted web content from the server and decrypt the encrypted web content by the JavaScript data encryption library. The decrypted web content may be stored to a local storage of the client browser and presented in the client browser.

The computer-readable may also be configured to encrypt a user entered data within the JavaScript data encryption library. The encrypted user entered data may then be transmitted to the server in an encrypted state. For added security, the local storage may be deleted upon closing of the browser session. The local storage may include one or more of a browser local storage; a window storage; a LocalStorage; a SessionStorage; and a JavaScript variable.

Other aspects of the invention include a computerized system to browse encrypted web content that is hosted on a server. The system includes a computer having a user interface and an internet browser and a program product comprising machine-readable program code for causing, when executed, the computer to perform process steps. The steps include prompting a client for a private key upon initiating a browser session. The private key is received in a JavaScript data encryption library in response to a user input of the private key. An encrypted symmetric key is also received from the server hosting the encrypted web content. The encrypted symmetric key is decrypted in the JavaScript data encryption library. The encrypted web content is received from the server and decrypted by the JavaScript data encryption library. The decrypted web content is then stored to a local storage of the client browser and presented in the client browser.

User entered data may also be encrypted in the JavaScript data encryption library. The encrypted user entered data may then be transmitted to the server. The local storage may also be automatically deleted upon closing of the browser session. The local storage may include one or more of a browser local storage; a window storage; a LocalStorage; a SessionStorage; and a JavaScript variable.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system, method, and computer software program product for providing data encryption for web browsing computing environments. The system provides a highly encrypted and secure data, conveniently accessible through browser with no additional software installed. The data remains encrypted at rest and in transit.

Figure 1:
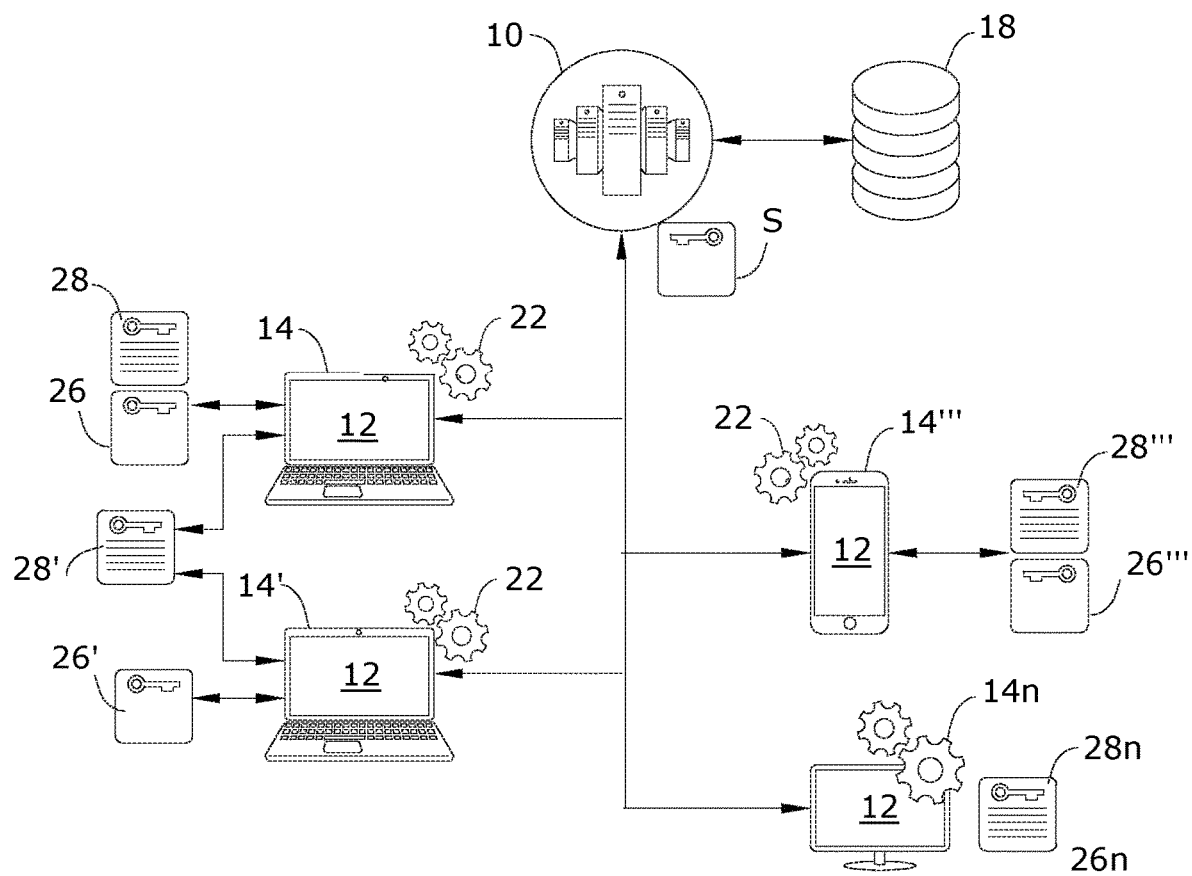
FIG. 1 is a system architecture of the browser session encryption system.
Figure 2:
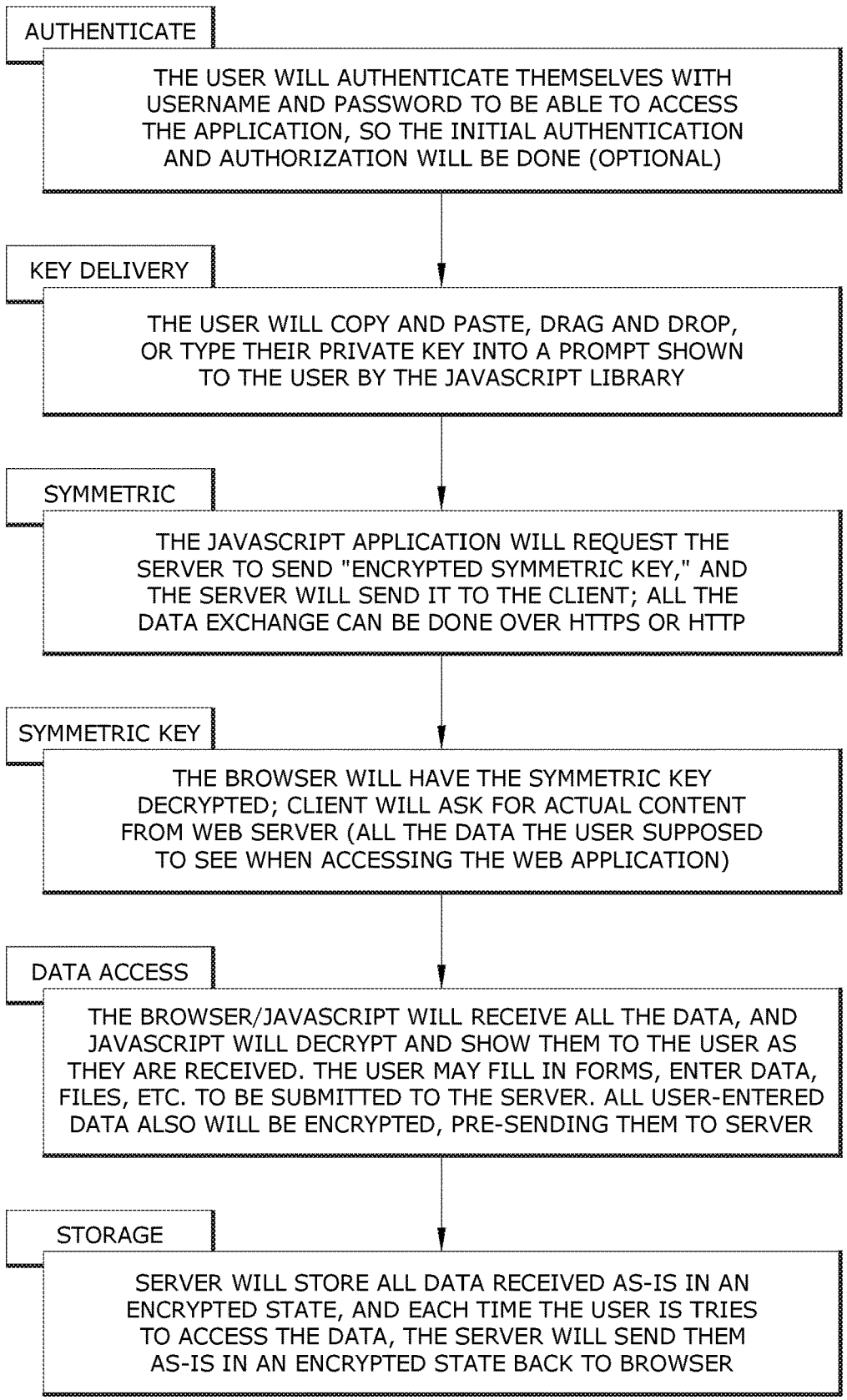
FIG. 2 is a flow chart of an embodiment of the encryption.
Figure 3:
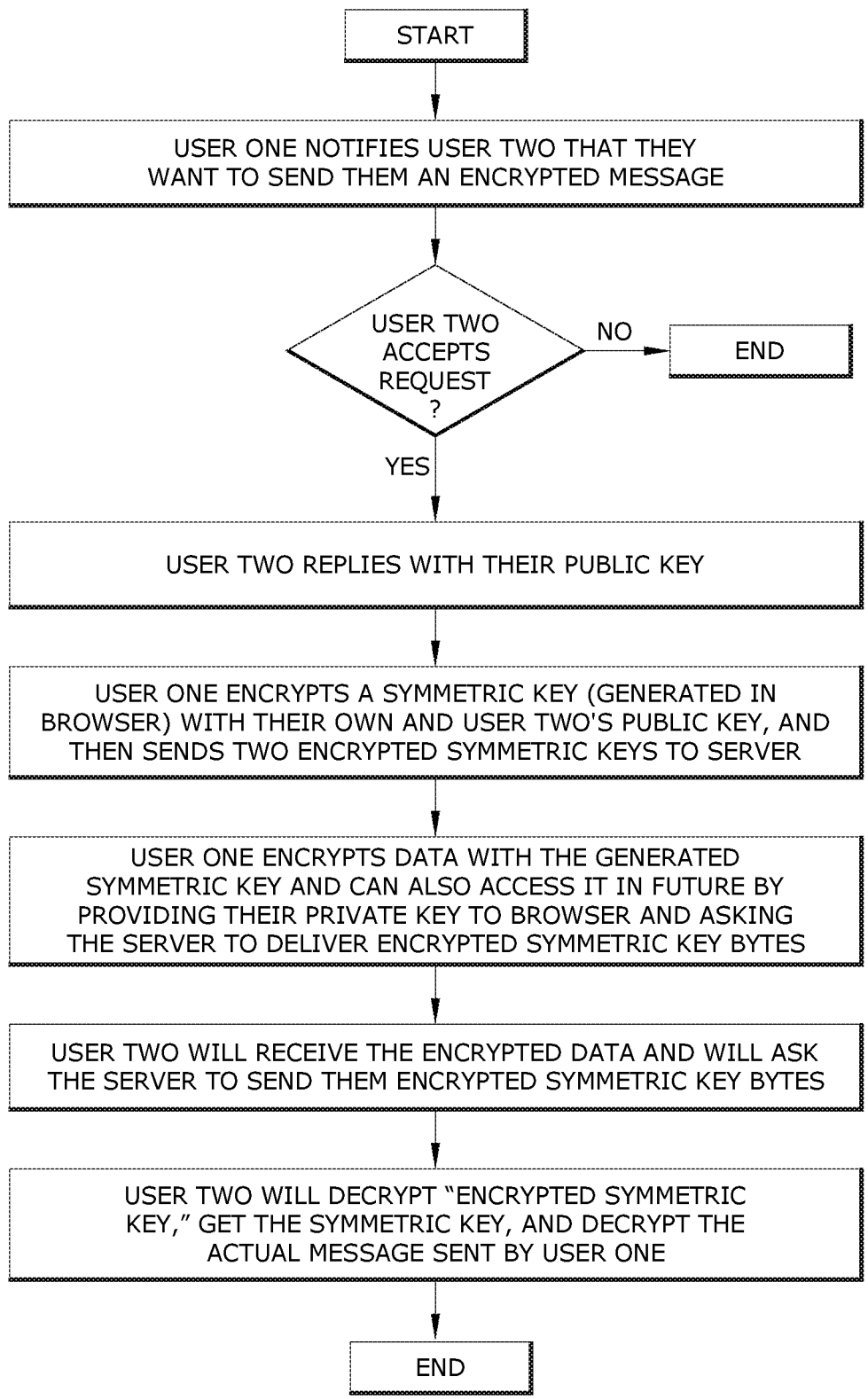
FIG. 3 is a flow chart illustrating a two user application of various aspects of the invention.

Referring now to FIG. 1, a system according to aspects of the invention includes an Internet browser 12 operable on a display of a client computing device 14, 14", 14"', . . . 14n; a JavaScript data encryption library 22 operating on the client computing device 14; a public key encryption algorithm; a server 10; and a private key 26 public key 28 pair of a user of such client computing device 14.

The user of such client computing device 14 may open the browser 12, which may be any modern web browser, such as Microsoft Internet Explorer, Mozilla Firefox, Apple Safari, or the like. By navigating to a website, a web URL or a web based application, the JavaScript data encryption library 22 will be loaded to run in user's browser 12. The library 22 is configured with symmetric and asymmetric encryption libraries and codes. The server 10 will send an encrypted key data to the browser JavaScript data encryption library 22. The user of such client computing device 14 may then provide their private key 26 and the JavaScript data encryption library 22 decrypts the encrypted key data and obtains a symmetric key S used to encrypt all the data the server 10 transmits to the browser 12 during a session. When the server 10 transmits data in encrypted form, the browser 12 is configured to decrypt the received data using the JavaScript data encryption library 22 and the private key 26 of the user of such client computing device 14.

By prompting the user of such client computing device 14 to provide their private key 26 in a public-key encryption schema, such as RSA or ELGamal, the JavaScript data encryption library 22 will then store this value in a local client storage location, such as a browser local storage, a window storage, a LocalStorage, a SessionStorage, or even a JavaScript variable. For added security, it is preferred that the local client storage location utilize a temporary or a session storage location so that when the user's browser session is ended, or the browser window 12 is closed, data residing in the session storage will be deleted. Once the user's private key 26 is provided, the JavaScript data encryption library 22 will be able to receive website data in encrypted form along with the encrypted symmetric key S from the server 10. Symmetric key S used to encrypt the data in website is encrypted using the user's public key 26 so it will be accessible and decryptable only with user's private key 28. JavaScript code in the user's browser 12 decrypts the encrypted symmetric key S received from the server 10 using the user's private key 26 that stored in the local client storage location so that the symmetric key S may decrypt website content received by the client 14. More content can be loaded using Ajax and JavaScript calls to server 10 to achieve a functional website and/or web application with all of its data staying encrypted in transit and at rest.

In operation, the browser 12 will load the JavaScript data encryption library 22 for all encryption/decryption and key management tasks. The user of such client computing device 14 may copy/paste, manually type or drag/drop, or otherwise provide their private key information 26 into the browser 12 that is running the JavaScript data encryption library 22. The JavaScript data encryption library s2 stores the public-key schema private key 26 into the local client storage location, preferably a session storage. Now future requests and data transfers between the server 10 and client 14 will be encrypted and decrypted by JavaScript data encryption library 22 decrypting the encrypted symmetric key S, received from server 10. Now the JavaScript encryption library 22 can encrypt and/or decrypt data using any symmetric encryption algorithm.

After decrypting the encrypted symmetric key S, the JavaScript data encryption library 22 will have the symmetric key S available so that all data communicated between the client 14 and the server 10 will be automatically encrypted or decrypted using this JavaScript data encryption library s2. The server 10 is configured to store all received data in encrypted form on a server storage 18, such as a database, a file system, or any storage the server 10 is utilizing so that when the client 14 requests data, the server 10 sends it to browser 12 in encrypted form.

The system, method may also be utilized to provide a fully functional web content management platform or JavaScript UI framework which can keep the data encrypted at all states except when the user 14 is utilizing the decrypted data in their browser window 12.

The system of the present invention may include at least one computer with a user interface. The computer may include any computer including, but not limited to, a desktop 14n, a laptop 14, 14', a smart device 14''', such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A non-transitory computer-readable memory adapted for use by a client browser to browse an encrypted web content hosted on a server; the computer-readable memory used to direct a computer to perform the steps of:
   prompting a user of a client browser to provide a private key upon initiating a browser session;
   receiving the private key in a program language data encryption library in response to a user providing the private key and storing the private key in a local storage;
   after the user initiates the browser session, receiving an encrypted symmetric key from the server hosting the encrypted web content;
   decrypting the encrypted symmetric key in the program language data encryption library using the private key;
   receiving the encrypted web content from the server;
   decrypting the encrypted web content by the program language data encryption library using the decrypted symmetric key and storing the decrypted web content to the local storage of the client browser;
   presenting the decrypted web content in the client browser; and
   deleting the local storage upon closing of the browser session.

2. The non-transitory computer-readable memory of claim 1, further comprising:
   encrypting a user entered data using the program language data encryption library.

3. The non-transitory computer-readable memory of claim 2, further comprising:
   transmitting the encrypted user entered data to the server.

4. The non-transitory computer-readable memory of claim 1, wherein the local storage comprises:
one or more of a browser local storage; a window storage; a LocalStorage; a SessionStorage; and a program language variable.

5. The non-transitory computer-readable memory of claim 1, wherein the program language data encryption library is a JavaScript data encryption library.

6. A computerized system to browse encrypted web content hosted on a server, the system comprising:
a computer having a user interface and an internet browser; and
a program product comprising machine-readable program code for causing, when executed, the computer to perform the following process steps:
prompting a user of a client browser to provide a private key upon initiating a browser session;
receiving the private key in a program language data encryption library in response to a user providing the private key and storing the private key in a local storage;
after the user initiates the browser session, receiving an encrypted symmetric key from the server hosting the encrypted web content;
decrypting the encrypted symmetric key in the program language data encryption library using the private key;
receiving the encrypted web content from the server;
decrypting the encrypted web content by the program language data encryption library using the decrypted symmetric key and storing the decrypted web content to the local storage of the client browser;
presenting the decrypted web content in the client browser; and
automatically deleting the local storage upon closing of the browser session.

7. The computerized system of claim 6, further comprising:
encrypting a user entered data using the program language data encryption library.

8. The computerized system of claim 7, further comprising:
transmitting the encrypted user entered data to the server.

9. The computerized system of claim 6, wherein the local storage comprises:
one or more of a browser local storage; a window storage; a LocalStorage; a SessionStorage; and a program language variable.

10. The computerized system of claim 6, wherein the program language data encryption library is a JavaScript data encryption library.

* * * * *